United States Patent [19]

Baba

[11] Patent Number: 4,955,011
[45] Date of Patent: Sep. 4, 1990

[54] INFORMATION RECORDING/REPRODUCING APPARATUS WITH CONTROL DEVICE FOR MAINTAINING HEAD VELOCITY BELOW A CRITICAL VELOCITY

[75] Inventor: Hisatoshi Baba, Yokohama, Japan

[73] Assignee: Canon Kabushiki Kaisha, Tokyo, Japan

[21] Appl. No.: 356,662

[22] Filed: May 23, 1989

Related U.S. Application Data

[63] Continuation of Ser. No. 35,771, Apr. 8, 1987, abandoned.

[30] Foreign Application Priority Data

Apr. 10, 1986 [JP]  Japan .................................. 61-81103
Jun. 16, 1986 [JP]  Japan ................................. 61-138345

[51] Int. Cl.$^5$ ............................................. G11B 7/085
[52] U.S. Cl. .................................... 369/54; 360/78.07; 369/32; 369/56; 369/219
[58] Field of Search ......................... 369/24, 32, 33, 43, 369/44, 54, 55–58, 219, 220, 221; 360/78.04, 78.06, 78.07, 78.08

[56] References Cited

U.S. PATENT DOCUMENTS

| | | | |
|---|---|---|---|
| 4,168,457 | 9/1979 | Rose | 360/78.06 X |
| 4,236,232 | 11/1980 | Jansen et al. | 369/33 X |
| 4,473,898 | 9/1984 | Ono | 369/221 |
| 4,481,613 | 11/1984 | Yokota | 369/56 |
| 4,488,277 | 12/1984 | McFarlane et al. | 369/54 X |
| 4,509,154 | 4/1985 | Kimoto | 369/33 |
| 4,512,010 | 4/1985 | Yamada et al. | 369/221 X |
| 4,527,263 | 7/1985 | Nakagawa | 369/54 X |
| 4,544,968 | 10/1985 | Anderson et al. | 360/78.06 |
| 4,547,822 | 10/1985 | Brown | 360/78.06 |
| 4,591,933 | 5/1986 | Quackenbush | 360/78.06 X |
| 4,615,023 | 9/1986 | Inada et al. | 369/33 X |
| 4,644,514 | 2/1987 | Ohshima et al. | 369/57 X |
| 4,677,602 | 6/1987 | Okano et al. | 369/33 X |
| 4,695,989 | 9/1987 | Kimoto | 369/56 X |
| 4,698,796 | 10/1987 | Kimura | 369/33 X |
| 4,701,897 | 10/1987 | Nakagawa | 369/33 X |
| 4,825,432 | 4/1989 | Takahashi | 369/219 X |

*Primary Examiner*—Alan Faber
*Assistant Examiner*—W. R. Young
*Attorney, Agent, or Firm*—Fitzpatrick, Cella, Harper & Scinto

[57] ABSTRACT

An information recording/reproduction apparatus wherein a head is provided for performing an information recording on an information recording medium, and/or retrieving and/or reproducing the recorded information from the recording medium. A head moving device moves the head relative to the recording medium and a control device controls the head moving device properly according to a recording reproduction time or a retrieval time. Whether a state of the head falls within an appropriate range each time is monitored and a signal is emitted to apply a damping force to the head when the state of the head deviates from the appropriate range.

11 Claims, 5 Drawing Sheets

INFORMATION RECORDING/REPRODUCING APPARATUS WITH CONTROL DEVICE FOR MAINTAINING HEAD VELOCITY BELOW A CRITICAL VELOCITY

This application is a continuation of application Ser. No. 035,771, filed Apr. 8, 1987, now abandoned.

BACKGROUND AND SUMMARY OF THE INVENTION

The present invention relates to an information recording/reproduction apparatus comprising a head movement control means and, more particularly, to an information recording/reproduction apparatus comprising a device for preventing overrunning of a head when head control is inappropriate.

In an information recording/reproduction apparatus such as an optical disk apparatus, laser beams are focused to form a 1-$\mu$m beam spot using an objective lens, and information is recorded or reproduced using the small beam spot.

In order to increase an information retrieval speed, conventionally, an optical head is normally moved by a voice-coil type linear motor. In the apparatus of this type, upon retrieval of information, a current head position is detected using address information of the optical disk, and a distance to a target information track position is calculated. The linear motor is then controlled so that the head is moved by the calculated distance at high speed. In order to position the optical head at high speed and with high precision, the velocity or position of the linear motor is controlled using an external linear encoder or reflected diffraction light when light beams cross the tracks. At this time, if a signal from the linear encoder is inappropriate for any reason or if a focal point of the beam spot is not present on the disk surface and positional information of the linear motor cannot be obtained, the linear motor cannot be controlled and overruns. In this case, since the linear motor has only a finite operating distance, a head collides against a mechanical stopper and is stopped. Since the optical head is constituted by high-precision parts, if an excessive vibration or shock is applied thereto, the performance of the head is degraded, and in the worst case, the head is damaged and the apparatus malfunctions, resulting in a serious problem. In an information recording/reproduction mode, the linear motor is driven so that the beam spot is moved along information tracks. Therefore, the linear motor is driven in accordance with a tracking error signal or positional information from a tracking actuator. In this case, if a normal control state is disordered due to unexpected disturbance or the like, the linear motor overruns, and the same problem, as above, occurs.

The present invention has been made in consideration of the above situation, and has as its object to detect overrunning of a linear motor or a head to stop the linear motor, thereby preventing collision of the head against a stopper.

In order to achieve the above objects, there is provided an information recording/reproduction apparatus wherein a head performs information recording and/or retrieving and/or reproducing the recorded information on or from an information recording medium the head is moved relative to the recording medium and the head moving device is controlled properly according to the recording, reproduction time or the retrieval time. The state of the head is monitored to determine if it falls within an appropriate range and a signal is limited to apply a damping force to the head when the head deviates from the appropriate range.

In this case, as to what kind of parameter or parameters is utilized to monitor the state of the head, there are various ways (e.g., as a parameter, to select a set of the position and the velocity of the head, or the velocity of the head alone, or the drive force of the head moving device), and the configuration of the appropriate range is determined according to each case, taking several factors into account. In summary, any of them can be taken as long as the collision between the head and the stopper is certainly prevented, which is a final object.

First in order to achieve this final object, there is provided an information recording/reproduction apparatus for recording information on an information recording medium and/or retrieving and/or reproducing the recorded information therefrom, wherein a head is moved to perform the above operations relative to the recording medium. The position of the head on the recording medium is detected by a suitable detector and the velocity of the head is also detected. The actual head velocity is composed with a critical head velocity predetermined for each position on the recording medium. When the head velocity exceeds the critical velocity, a stop drive force is applied to the head.

According to a more detailed aspect of the present invention, the velocity of the head can be detected as follows. When the head moving device utilizes an electromagnetic effect due to a fixed magnetic field and a current flowing through a linear motor coil, as in a linear motor, the velocity of the head can be detected using a counter electromotive force generated in the linear motor coil.

Furthermore, in order to achieve the above object, there is provided an information recording/reproduction apparatus for recording information on an information recording medium and/or reproducing the recorded information therefrom, wherein a head is moved in order to perform the above operations relative to the recording medium; a drive force of the head moving device is detected and it is determined whether or not the drive force of the head moving device falls within a predetermined level range. When the drive force of the head moving device exceeds the predetermined level range, a stop drive force is applied to the head moving means.

BRIEF DESCRIPTION OF THE DRAWINGS

FIG. 3 is a graph showing a critical velocity curve and the like;

DETAILED DESCRIPTION OF THE EMBODIMENTS

An embodiment of an information recording/reproduction apparatus according to the present invention will now be described hereinafter in detail with reference to the accompanying drawings.

Figure 1:
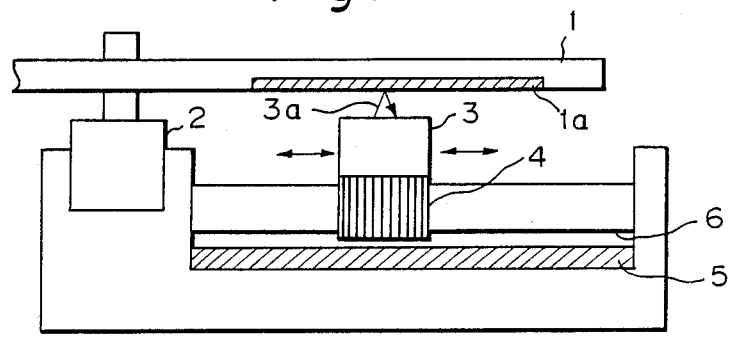
FIG. 1 is a view showing a mechanism portion of an information recording/reproduction apparatus according to the present invention.

Referring to FIG. 1, an optical disk 1 as an information carrier has a recording medium layer for recording information therein, a guide groove for guiding a beam spot, and address information representing a position on the disk. The address information is stored in a range indicated by a hatching portion 1a. The optical disk 1 is rotated by a spindle motor 2 and is subjected to an information recording or reproduction operation by means of laser beams emitted from an optical head 3. The optical head 3 has a focus servo mechanism for positioning a focal point of the laser spot on an information recording surface of the optical disk 1, and a tracking servo mechanism for controlling an irradiation position of the laser spot along the guide groove. Note that a laser beam emitted from the optical head 3 is indicated by numeral 3a.

A linear motor coil 4 serves to move the optical head 3 in a radial direction (indicated by arrows in FIG. 1) due to an electromagnetic effect generated by a magnetic flux between a magnet 5 and a yoke 6, and by a current flowing through the linear motor coil 4.

Figure 2:
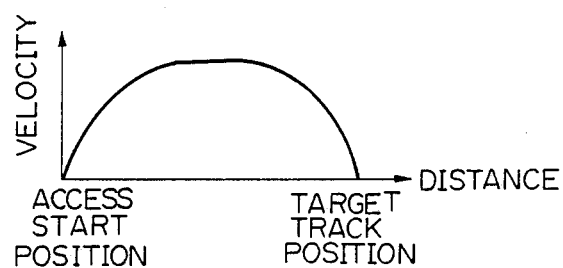
FIG. 2 is a graph showing a velocity curve of a linear motor in an information retrieval mode.

In an information retrieval mode, an address of a track currently irradiated with the beam spot is reproduced, and a distance between a current position and a target track position is calculated by a microcomputer (not shown), and a control curve as shown in FIG. 2 is plotted in accordance with the characteristics of a linear motor, thereby controlling a current flowing through the linear motor coil 4 corresponding to the control curve. At this time a detector for detecting the position of the linear motor, i.e., the position of the optical head 3 is realized by counting a tracking error signal obtained when the beam spot crosses the track.

A second velocity detector is provided to the linear motor in addition to the first velocity detector for counting the tracking error signal. The second velocity detector can be realized by detecting, e.g., a counter electromotive force generated in the linear motor coil 4.

Figure 4:
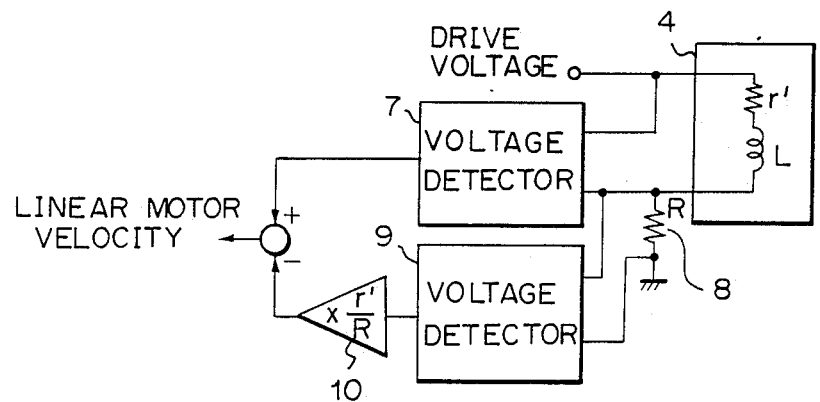
FIG. 4 is a block diagram of a velocity detector.

FIG. 4 is a block diagram showing an example of the second detector.

In FIG. 4, the linear motor coil 4 is equivalently expressed by an inductance L and an internal resistance r′. A voltage detector 7 detects voltage across the linear motor coil 4. A current detection resistor 8 (resistance R) is connected in series with the linear motor coil. A voltage detector 9 detects voltage across the resistor 8. An amplifier 10 has a r′/R gain.

An output from the voltage detector 9 corresponds to a breakdown voltage of the linear motor coil caused by current flowing through the linear motor coil 4. When a difference between the voltage and an output from the voltage detector 7 is calculated by the amplifier 10, a counter electromotive force of the linear motor coil 4 can be obtained. The counter electromotive force is a signal proportional to a linear motor velocity.

In the detection circuit shown in FIG. 4, precise velocity detection can be performed only when DC current flows through the linear motor coil 4. In order to more precisely detect velocity, the amplifier 10 can have a $(r' + \delta\omega L)/R$ gain including the inductance component of the linear motor coil 4.

In this embodiment, the output from the velocity detector is integrated to obtain a position signal of the linear motor.

In the following description, in order to prevent confusion, detection velocity and a detection position which are derived from the tracking error signal will be referred to as a first velocity signal and a first position signal, respectively, and detection velocity and detection speed which are derived from the counter electromotive force of the linear motor coil 4 will be referred to as a second velocity signal and a second position signal, respectively.

As has been described above, linear motor control for information retrieval is performed by the first velocity signal and the first position signal.

When a maximum drive force is applied to a stop direction in consideration of an acceleration characteristic of the linear motor or an anti-acceleration characteristic of the optical head 3 and an operating range of the linear motor, a maximum moving velocity of the linear motor at which the linear motor can be stopped at the end of the operating range is calculated for every position of the linear motor, and velocity curves are plotted. In this case, velocity curves as indicated by a and b in FIG. 3 can be obtained.

Figure 3:
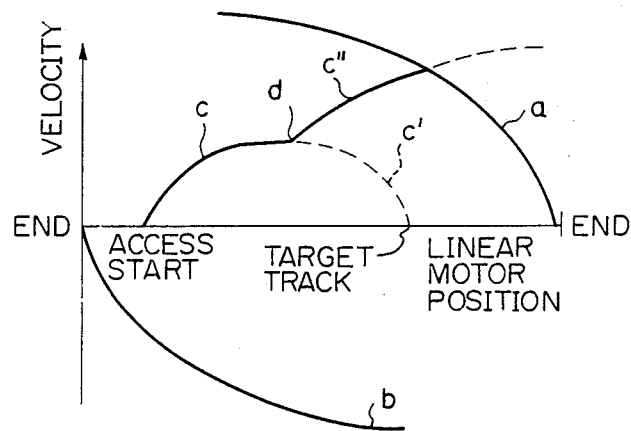

In FIG. 3, a linear motor position is plotted along the abscissa, and the velocity is plotted along the ordinate. The curve represents a critical velocity at which the moving linear motor, i.e., the moving head 3 can be stopped without colliding against a stopper at the end of the operating range. For example, in a linear motor which generates a maximum acceleration $a$, its velocity curve is represented by $v = \sqrt{2as}$ (where v: velocity, s: distance).

The critical velocities at the respective positions of the linear motor correspond to a curve indicated by a or b in accordance with a direction of velocity. If the linear motor is driven at a speed in a range defined by the two curves, it can be prevented from colliding against the stopper.

When it is detected that an actual velocity exceeds the critical curves, the maximum drive force in a deceleration direction is applied to the linear motor, and when the velocity of the linear motor reaches zero, application of the drive force is stopped. This operation will be described with reference to FIGS. 3 and 5.

Figure 5:
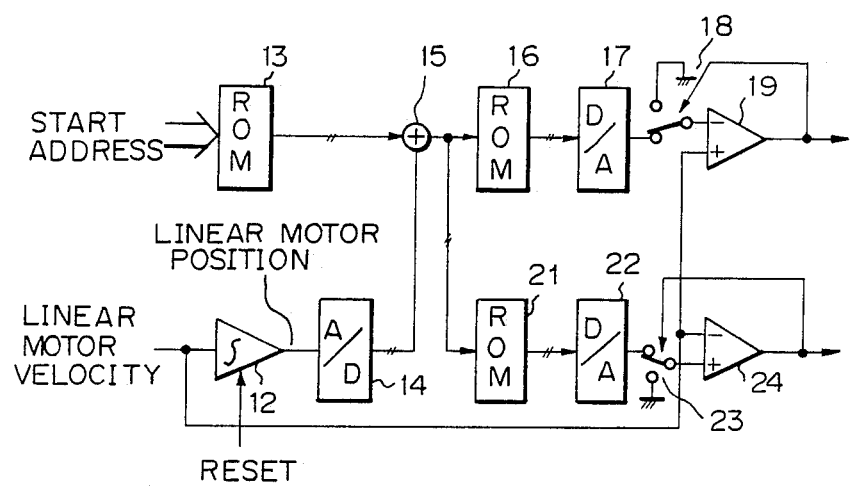
FIG. 5 is a block diagram of a circuit for detecting and controlling overrunning of a linear motor.

FIG. 5 is a block diagram of a circuit for controlling the above operation. In FIG. 5, the control circuit includes a ROM table 13, an A/D converter 14 for converting a linear motor position into a digital signal, an adder 15 for monitoring an absolute position and velocity of the linear motor, ROM tables 16 and 21, D/A converters 17 and 22, switches 18 and 23, and comparators 19 and 24.

Upon accessing, an access start address is read to calculate a distance up to a target track position, and a target velocity curve corresponding to the calculated distance is prepared. This corresponds to a curve c-c′ in FIG. 3.

The start address is input to the ROM table 13, and is converted to an absolute position of the linear motor. This corresponds to an access start position in FIG. 3. An integrator 12 shown in FIG. 5 is reset.

When the linear motor begins to move, the linear motor is controlled to be driven along the target velocity curve c-c' based on the first velocity and position signals. The second velocity and position signals are calculated with the access start position in the circuit shown in FIG. 5, thereby obtaining the absolute position of the linear motor. More specifically, an output from the adder 15 for monitoring the absolute position and velocity of the linear motor corresponds to the absolute position of the linear motor. The absolute position, i.e., a linear motor position plotted along the abscissa of FIG. 3 is input to the ROM table 16, and is converted to the critical velocity. Then, the critical velocity is D/A-converted to obtain the critical velocity curve a in FIG. 3. Similarly, the curve b is obtained using the ROM table 21 and the D/A converter 22.

When a focus servo error occurs at a point d and tracking error signal, i.e., the first velocity and position signals become inappropriate, the linear motor overruns along a curve c''. This state can be immediately detected by the second velocity signal, and the detected velocity of the linear motor is compared with an output from the D/A converter 17 or 22. When the velocity of the linear motor exceeds the critical velocity curve, access control of the linear motor is interrupted by the comparator 19 or 24, and the maximum counter drive force in accordance with the moving direction of the linear motor is applied thereto, thereby stopping the linear motor.

When input switches of the comparators 19 and 24 are switched, and the critical velocity is then detected, the velocity of the linear motor is compared with a ground level, i.e., velocity "zero". Therefore, the stop drive force is applied until the velocity of the linear motor reaches zero.

Figure 6:
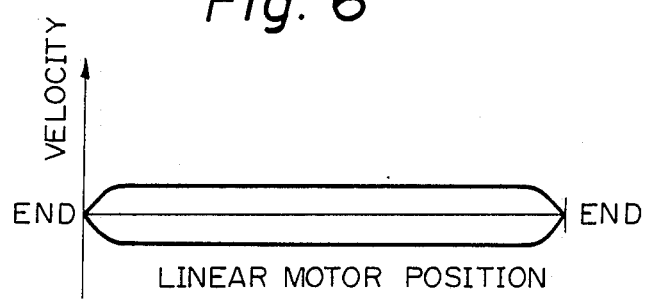
FIG. 6 is a graph showing a critical velocity curve in an information recording/reproduction mode.

The operation in the information recording or reproduction mode will be described below. In the recording or reproduction mode, the linear motor is slowly moved along the spiral path of the track. For this reason, a critical velocity and an actual velocity of the linear motor are compared with each other using a critical velocity curve shown in FIG. 6 in the same manner as in the access mode described above, thereby stopping the linear motor. At this time, as an address corresponding to the start address shown in FIG. 5, an address read upon recording or reproduction of information is input for each time, thereby resetting the integrator 12.

Alternatively, a constant critical velocity can be compared with an actual velocity of the linear motor regardless of the absolute position of the linear motor.

Figure 7:
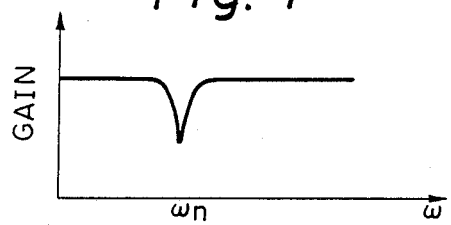
FIG. 7 is a graph showing frequency characteristics of a band-pass filter.

When the linear motor is driven in accordance with an eccentric frequency component of the disk, i.e., the linear motor follows the track in synchronism with rotation of the disk, the output from the second velocity detector passes through a band-pass filter having a characteristic shown in FIG. 7 to control a rotational frequency $\omega n$ of the disk.

The present invention is not limited to the above embodiment, and various modifications may be made.

For example, the ends of the critical velocity curve can be set to have a certain margin, i.e., to be separated from the stopper of the linear motor at a given distance.

Data in the ROM tables and the like shown in FIG. 5 may be calculated by a computer.

In FIG. 3, when the critical speed is set in accordance with the acceleration characteristics of the linear motor, it must be set in consideration of various mechanical conditions such as weight of the linear motor, friction, and the like, and various overrunning modes of the linear motor. In a simplest method, the critical velocity can be set in consideration of the worst overrunning conditions. Alternatively, various critical velocities may be set in consideration of various overrunning conditions. For example, different critical velocities are used in the information retrieval mode and in the information recording/reproduction mode.

As described above, the critical speed can be set in accordance with the anti-acceleration characteristic of the head (in a case wherein the head has a mechanical strength not high enough to cope with shock generated by a linear motor drive force or another stop device, e.g., a mechanical brake).

In the above embodiment, the velocity of the head is detected through a head moving device using the second velocity signal. However, apparatus for directly detecting the moving velocity of the head itself may be used. In this case, a velocity detection device must be independently arranged in addition to the arrangement of the above embodiment.

In the embodiment shown in FIG. 1, the recording medium has a disk-like shape. The information recording/ reproduction apparatus of the present invention may be applied to an apparatus for processing information on recording media having other shapes, such as a card-like shape, through a head.

The information recording/reproduction apparatus of the present invention is not limited to one of the optical type, but can be applied to an information recording medium using a magnetic, electric, or chemical system.

A second embodiment of the present invention will be described below. FIGS. 1 and 2 can also be used in this embodiment. Explanations in connection therewith can also be used.

Figure 8:
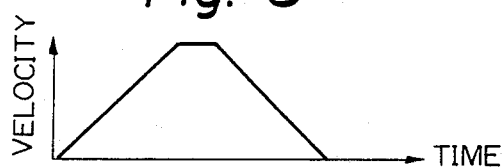
FIG. 8 is a graph showing the velocity of a linear motor as a function of time in the second embodiment.

If a velocity curve shown in FIG. 2 is represented as a function of time (abscissa), a velocity curve shown in FIG. 8 can be obtained. The relationship between a drive force (ordinate) applied to the linear motor and time (abscissa) is as indicated by a solid line in FIG. 9. According to the second embodiment, curves as indicated by broken curves a' and b' including a drive force curve in an ideal and appropriate control state (including a case other than the line shown in FIG. 9) are plotted. The curves a' and b' are used to determine that appropriate control is not performed when control falls outside the range defined by the broken curves a' and b'. Therefore, the curves a' and b' are determined by a boundary between the tolerance in linear motor control and an error exceeding the tolerance. A current flowing through the linear motor coil 4 is detected, and if the detected current exceeds the range of the broken curves a' and b' in FIG. 9, the linear motor is immediately stopped.

Figure 10:
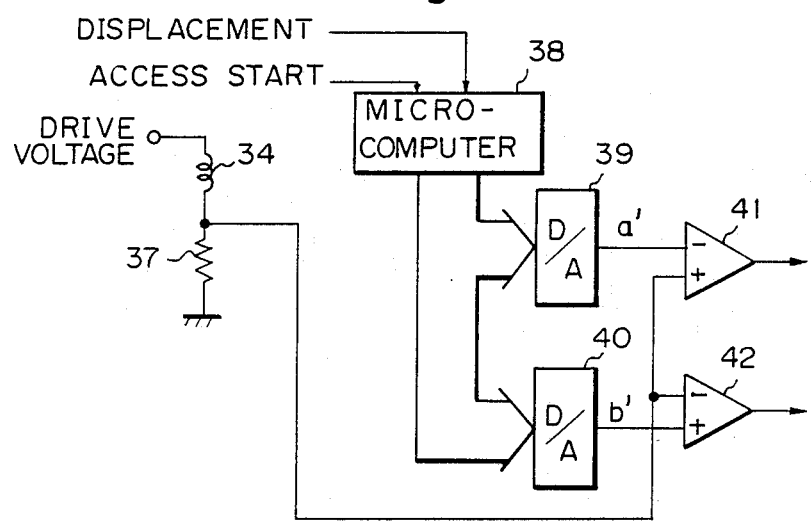
FIG. 10 is a block diagram showing an overrunning detection circuit.

This operation will be described with reference to FIG. 10 showing an example of a control circuit therefor.

The control circuit shown in FIG. 10 includes a linear motor coil 4, a current detection resistor 37, a microcomputer 38 for calculating the broken curves a' and b' by arithmetic operations, D/A converters 39 and 40, and comparators 41 and 42 for comparing a current flowing through the linear motor coil 4 and the outputs from the D/A converters 39 and 40.

Figure 9:
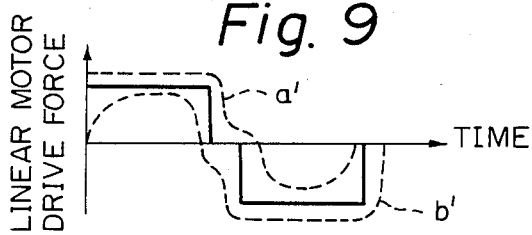
FIG. 9 is a graph showing a drive force of the linear motor as a function of time.

When a displacement signal and an access start command are input to the microcomputer 38, data corresponding to the broken curves a' and b' in FIG. 9 are respectively output to the D/A converters 39 and 40. Since the broken curves a' and b' are determined as a function of time, the data are output with reference to a clock of the microcomputer 38. In addition, velocity curve data of the linear motor (shown in FIG. 2 or 8) is output from the microcomputer 38 to be used for velocity control of the linear motor, but is omitted from FIG. 10.

Figure 11A:
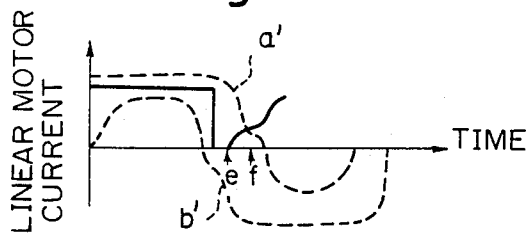
FIG. 11A is a graph showing a state wherein overrunning of the linear motor is detected.
Figure 11B:
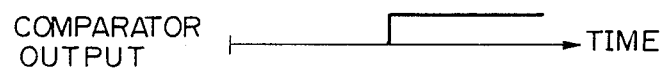
FIG. 11B is a timing chart for detection shown in FIG. 11A.

Current flowing through the linear motor coil 4 is detected in accordance with voltage applied across the current detection resistor 37 connected in series with the linear motor coil 4. The detected current is compared with the outputs form the D/A converters 39 and 40 by the respective comparators 41 and 42, thereby detecting if the current exceeds the range of the broken curves a' and b' in FIG. 11A. FIGS. 11A and 11B show cases wherein linear motor control is stopped. In FIG. 11A, a linear motor current is plotted along the ordinate, and time is plotted along the abscissa. In FIG. 11B, a comparator output is plotted along the ordinate and time is plotted along the abscissa. Assume that, at point e in FIG. 11A, linear motor control becomes inappropriate, e.g., a focused beam is not formed on the disk surface can a tracking error signal cannot be obtained. When the current exceeds a point f in FIG. 11A, the output from the comparator is ON, and overrunning of the linear motor can be detected. When overrunning is detected, the linear motor is quickly stopped using a brake or a separate velocity detector.

Figure 12:
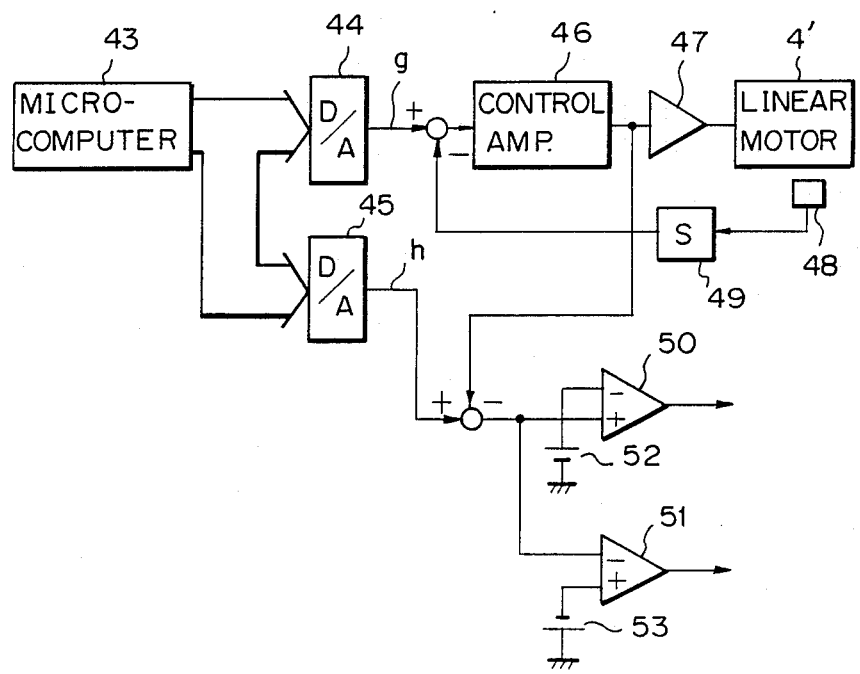
FIG. 12 is a block diagram of an overrunning detection circuit and an access control circuit according to yet another embodiment of the present invention.

Still another embodiment of the present invention will be described with reference to FIG. 12. A circuit shown in FIG. 12 includes a microcomputer 43, D/A converters 44 and 45 for converting digital signals from the microcomputer 43 into analog signals, a control amplifier 46, a driver 47 for a linear motor 4', a position detector 48 for the linear motor 4', a differentiator or velocity converter 49, and comparators 50 and 51. Note that potentials indicated by 52 and 53 are applied to the comparators 50 and 51, respectively.

Velocity curve data (corresponding to FIG. 8) of the linear motor upon accessing is output from the microcomputer 43 to the D/A converter 44, and a velocity curve signal shown in FIG. 8 is output onto a signal line g. The linear motor 4' is subjected to velocity control by the signal on the signal line g, thereby performing an access operation. This control loop is constituted by the control amplifier 46, the driver 47, the linear motor 4', the position detector 48, and the differentiator or velocity converter 49. The D/A converter 45 receives drive force data of the linear motor 4' and outputs a signal indicated by the solid line shown in FIG. 9 onto a signal line h. A difference between the signal h and the output from the control amplifier 46 is calculated and is input to the comparators 50 and 51. The difference signal is compared with the potentials 52 and 53 as threshold levels by the respective comparators 50 and 51, thereby detecting inappropriate control and overrunning of the linear motor 4'. In this case, the linear motor 4' is quickly stopped by the outputs from the comparators 50 and 51.

The operation in the information recording or reproduction mode will be described. In the recording or reproduction mode, the linear motor is slowly moved along the spiral path of the track. During the operation, a lower drive force than that in the access mode is applied to the linear motor. At this time, the drive force of the linear motor can be monitored using a given threshold level to detect overrunning of the linear motor.

When the linear motor is driven in accordance with an eccentric frequency component of the disk, i.e., the linear motor runs along the tracks in synchronism with rotation of the disk, the drive force signal of the linear motor passes through a band-pass filter in the same manner as in FIG. 7 to control a rotational frequency $\omega_n$ of the disk and to monitor the drive force, thereby detecting overrunning of the linear motor.

According to the information recording/ reproduction apparatus of the present invention as described above, control can be performed to detect overrunning of the linear motor and to quickly stop it. Therefore, the linear motor can be prevented from being damaged, and reliability of the apparatus can be improved.

What is claimed is:

1. An information recording and/or reproducing apparatus, comprising:
   a head for performing at least one of information recording for recording information on an information recording medium and information reproducing for reproducing recorded information from the recorded medium;
   moving means for moving said head relative to the recording medium, said moving means comprising means for applying a force including a braking force to said head;
   velocity detecting means for detecting velocity of said head; and
   control means comprising means for comparing the moving velocity detected by said velocity detecting means with a predetermined critical velocity for said head for controlling said moving means to apply the braking force to said head by said moving means for stopping said head when the moving velocity detected by said velocity detecting means exceeds the predetermined critical velocity.

2. An apparatus according to claim 1, further comprising position detecting means for detecting a position of said head relative to the recording medium, wherein the critical velocity varies corresponding to the head position and said control means further comprises means for comparing the critical velocity at the head position detected by said position detecting means with the moving velocity detected by said velocity detecting means.

3. An apparatus according to claim 2, wherein the critical velocity is a maximum moving velocity at each position of said head, and said velocity detecting means comprises means for detecting the maximum velocity for stopping said head at one of before and at an end of a moving range of said head.

4. An apparatus according to claim 2, wherein said moving means further comprises a linear motor including a linear motor coil for generating a counterelectromotive force, said velocity detecting means comprises means for detecting the moving velocity from the linear motor coil and said position detecting means further comprises means for detecting the position by integrating an output of said velocity detecting means.

5. An apparatus according to claim 1, wherein said head comprises an optical head.

6. An information recording and/or reproducing apparatus, comprising:

a head for performing at least one of information recording for recording information on an information recording medium and information reproducing for reproducing recorded information from the recording medium;

moving means for moving said head relative to the recording medium, said moving means comprising means for applying a force including a braking force to said head;

detecting means for detecting a driving force of said moving means; and control means comprising means for comparing the driving force detected by said detecting means with a predetermined threshold value for controlling said moving means to apply the braking force to said head for immediately stopping said head when the driving force detected by said detecting means exceeds the predetermined threshold value.

7. An apparatus according to claim 6, wherein said moving means comprises a linear motor including a linear motor coil and said detecting means comprises means for detecting the driving force by detecting current flowing in the linear motor coil.

8. An apparatus according to claim 6, wherein said head comprises an optical head.

9. An information recording and/or reproducing apparatus, comprising:

a head for performing at least one of recording information on and reproducing information from an information recording medium;

a motor for moving said head relative to the recording medium by applying a force including a braking force to said head;

a detection circuit for detecting a value of current applied to said motor; and a control circuit for comparing the current value detected by said detection circuit with a predetermined threshold value of current and for controlling said motor to apply the braking force to said head for immediately stopping said head when the current value detected by said detection circuit exceeds the predetermined threshold current value.

10. An apparatus according to claim 9, further comprising a setting circuit for setting the predetermined threshold current value, said setting circuit comprising means for generating a relationship between time and the predetermined threshold current value based on a moving distance of said head.

11. An apparatus according to claim 9, wherein said head comprises an optical head.

* * * * *

UNITED STATES PATENT AND TRADEMARK OFFICE
CERTIFICATE OF CORRECTION

PATENT NO. : 4,955,011

DATED : September 4, 1990

INVENTOR(S) : HISATOSHI BABA

It is certified that error appears in the above-identified patent and that said Letters Patent is hereby corrected as shown below:

COLUMN 1

Line 65, "medium the" should read -- medium. The --.

COLUMN 2

Line 2, "limited" should read -- emitted --.
    Line 11, "taking-several" should read -- taking several --.
    Line 34, "counter electromotive" should read -- counterelectromotive --.
    Line 48, "means." should read -- device. --.

COLUMN 3

Line 21, "hatching" should read -- hatched --.
    Line 52, "counter" should read -- counter- --.
    Line 68, "counter electromotive" should read -- counterelectromotive --.

COLUMN 4

Line 1, "counter electromotive" should read -- counterelectromotive --.
    Line 17, "counter electro-" should read -- counterelectro- --.

UNITED STATES PATENT AND TRADEMARK OFFICE
CERTIFICATE OF CORRECTION

PATENT NO. : 4,955,011

DATED : September 4, 1990

INVENTOR(S) : HISATOSHI BABA

It is certified that error appears in the above-identified patent and that said Letters Patent is hereby corrected as shown below:

<u>COLUMN 7</u>

Line 18, "form" should read -- from --.
Line 29, "can" should read -- and --.

Signed and Sealed this

Eighteenth Day of May, 1993

Attest:

MICHAEL K. KIRK

*Attesting Officer*

*Acting Commissioner of Patents and Trademarks*